United States Patent [19]

Simpson et al.

[11] 4,431,526

[45] Feb. 14, 1984

[54] MULTIPLE-STAGE HYDROPROCESSING OF HYDROCARBON OIL

[75] Inventors: Howard D. Simpson, Irvine; Dennis P. McArthur, Yorba Linda, both of Calif.

[73] Assignee: Union Oil Company of California, Brea, Calif.

[21] Appl. No.: 395,832

[22] Filed: Jul. 6, 1982

[51] Int. Cl.³ .................. C10G 45/00; C10G 45/04
[52] U.S. Cl. ...................... 208/211; 208/216 PP; 208/251 H; 208/254 H; 208/210
[58] Field of Search .......... 208/210, 216 PP, 251 H, 208/211, 254 H

[56] References Cited

U.S. PATENT DOCUMENTS

| | | | |
|---|---|---|---|
| 3,393,148 | 7/1968 | Bertolacini et al. | 208/264 |
| 3,562,800 | 2/1971 | Carlson et al. | 208/216 |
| 3,730,879 | 5/1973 | Christman et al. | 208/210 |
| 3,819,509 | 6/1974 | Wolk et al. | 208/216 |
| 3,876,523 | 4/1975 | Rosinski et al. | 208/89 |
| 3,891,541 | 6/1975 | Oleck et al. | 208/89 |
| 3,901,792 | 8/1975 | Wolk et al. | 208/210 |
| 3,931,052 | 1/1976 | Oleck et al. | 252/465 |
| 3,977,961 | 8/1976 | Hamner | 208/59 |
| 3,977,962 | 8/1976 | Arey, Jr. et al. | 208/59 |
| 3,998,722 | 12/1976 | Mayer et al. | 208/112 |
| 4,014,821 | 3/1977 | Hamner | 252/470 |
| 4,016,067 | 4/1977 | Fischer et al. | 208/89 |
| 4,048,060 | 9/1977 | Riley | 208/210 |
| 4,054,508 | 10/1977 | Milstein et al. | 208/89 |
| 4,069,139 | 1/1978 | Riley et al. | 208/216 PP |
| 4,073,718 | 2/1978 | Hamner | 208/80 |
| 4,082,695 | 4/1978 | Rosinski et al. | 252/465 |
| 4,119,531 | 10/1978 | Hopkins et al. | 208/251 |
| 4,188,284 | 2/1980 | Quick et al. | 208/216 |
| 4,212,729 | 7/1980 | Hensley, Jr. et al. | 208/210 |
| 4,306,964 | 12/1981 | Angevine | 208/210 |
| 4,328,127 | 5/1982 | Angevine et al. | 252/439 |

FOREIGN PATENT DOCUMENTS

| | | | |
|---|---|---|---|
| 2026533 | 2/1980 | United Kingdom | 208/210 |
| 2073770A | 3/1981 | United Kingdom | |

*Primary Examiner*—Delbert E. Gantz
*Assistant Examiner*—O. Chaudhuri
*Attorney, Agent, or Firm*—Alan H. Thompson; Gregory F. Wirzbicki; Dean Sandford

[57] ABSTRACT

In the catalytic hydroprocessing of hydrocarbons, a hydrocarbon oil is successively contacted with a first hydroprocessing catalyst in a first reaction zone and a second hydroprocessing catalyst in a second reaction zone. The first catalyst has an average pore diameter at least about 30 angstroms larger than the second catalyst, although both have narrow pore size distributions wherein at least about 90 percent of the total pore volume is in pores of diameter from about 100 angstroms to about 300 angstroms, and with essentially all the pores having diameters greater than 100 angstroms.

36 Claims, No Drawings

MULTIPLE-STAGE HYDROPROCESSING OF HYDROCARBON OIL

BACKGROUND OF THE INVENTION

This invention relates to catalysis, and particularly to hydrocarbon hydroprocessing catalysts, such as those utilized to catalyze the reaction of hydrogen with organosulfur, organonitrogen, and organometallic compounds. More particularly, this invention is directed to a process for utilizing catalysts for hydrodesulfurizing hydrocarbon liquids.

In a typical hydrocarbon refining process, portions of contaminant metals and sulfur components contained in a hydrocarbon oil ordinarily are deposited on porous refining catalysts, causing a loss of catalytic activity and stability as well as selectivity for yielding an intended product. Residual petroleum oil fractions, such as the heavy fractions produced in atmospheric and vacuum crude distillation columns, are especially undesirable as feedstocks for most catalytic refining processes due to their high metals and sulfur content. Economic considerations have recently provided new incentives for catalytically converting the heavy fractions to more marketable products. However, the presence of high concentrations of sulfur and metals, the latter often being found in relatively large porphyrin molecules, precludes the effective use of residua as feedstocks for cracking, hydrocracking, and similar catalytic refining operations.

Methods are available to reduce the sulfur and metals content of residua. One such method is hydrodesulfurization, a process wherein a residuum, usually containing the bulk of the asphaltene components of the original crude from which the residuum was derived, is contacted with a catalyst usually containing hydrogenation metals on a porous refractory oxide support under conditions of elevated temperature and pressure and in the presence of hydrogen, such that the sulfur components are converted to hydrogen sulfide while the metals are simultaneously deposited on the catalyst. However, the deposition of contaminant metals on the catalyst causes deactivation of the catalyst, and, in the usual instance, the extent of deactivation is a function of the amount of metals deposition on the catalyst surface and in its pores, i.e., the usefulness of the catalyst steadily decreases as the amount of deposited metals increases with continued treatment of the residuum.

It has been recognized that typical hydroprocessing catalysts, especially those utilized for hydrodesulfurization purposes, have specific pore size characteristics effective for catalytic processing of residuum. For example, a catalyst employed in a two-catalyst hydrodesulfurization process ordinarily includes at least one desulfurization catalyst having a sizable number of pores of diameter less than 100 angstroms. Although such a catalyst often exhibits high desulfurization activity for a relatively short period of time, its usefulness, i.e. life, is manifestly short in the absence of a catalyst effecting metals removal. The hydrodesulfurization process disclosed in U.S. Pat. No. 4,048,060 is typical of a two-catalyst process employing a first catalyst of relatively small pore characteristics (i.e. some pore diameters less than 100 angstroms) for desulfurization and a second catalyst additionally effecting metals removal. Moreover, U.S. Pat. Nos. 3,931,052 and 4,328,127 disclose catalysts that have specific pore size distributions and are employed in processes involving demetallation of petroleum oil; however, both teach the use of catalysts in combination with catalysts having some pore sizes less than 100 angstroms.

Catalytic hydroprocessing of hydrocarbons presently involving multiple reaction zones provides only limited improvement to such problems as catalyst activity before desirable characteristics such as catalyst stability (i.e. life) are adversely affected. A need still exists for an improved combination of hydroprocessing catalysts having specific pore size characteristics, better surface characteristics, improved feedstock diffusion capabilities, and the like.

It is, therefore, a major object of the present invention to provide a process utilizing a combination of hydroprocessing catalysts and specifically, to provide a process for the catalytic hydroprocessing of a hydrocarbon oil utilizing two catalysts having beneficial pore size characteristics.

It is another object of the invention to provide an improved process for the catalytic hydrodesulfurization of a hydrocarbon oil, and more specifically, to provide a process for the hydrodemetallization and hydrodesulfurization of heavy hydrocarbon oil fractions.

It is a further object still to provide an improved process for hydrodemetallizing a hydrocarbon oil while maintaining a high degree of desulfurization.

A further object of the invention is to provide hydrocarbon products of reduced metals content so as to extend the life of downstream refining catalysts.

These and other objects and advantages of the invention will become apparent from the following description.

SUMMARY OF THE INVENTION

The present invention is directed to a process for the catalytic hydroprocessing of a hydrocarbon oil by successively contacting the oil in the presence of hydrogen under hydroprocessing conditions with a first hydroprocessing catalyst in a first reaction zone and a second hydroprocessing catalyst in a second reaction zone. The first hydroprocessing catalyst has an average pore diameter at least 30 angstroms larger than that of the second hydroprocessing catalyst, but both catalysts have a narrow pore size distribution wherein essentially all the pores are of diameter greater than 100 angstroms, less than 10 percent of the total pore volume is in pores of diameter greater than 300 angstroms, and at least about 35 percent of the total pore volume is in pores of diameter between about 150 and about 200 angstroms. Generally, the catalysts contain one or more hydrogenation components, typically Group VIB and Group VIII metal components, on a porous refractory oxide support material usually containing alumina, and are ordinarily utilized to enhance the removal of substantial amounts of metal contaminants in addition to sulfur from a metals-containing hydrocarbon oil.

In a preferred embodiment of the invention, a hydrocarbon residuum oil is hydrodesulfurized by first contacting the oil in the presence of hydrogen under hydrodemetallizing conditions with a hydrodemetallizing catalyst having a surface area from about 75 $m^2$/gram to about 200 $m^2$/gram and at least about 80 percent of the total pore volume in pores of diameter between about 150 and about 300 angstroms. The resulting hydrocarbon product of reduced metals content is subsequently contacted under hydrodesulfurization conditions with a dual-function hydrodesulfurization/hydrodemetallization catalyst having a surface area from about 100 m²/gram to about 200 m²/gram and at least about 80 percent of the total pore volume in pores of diameter between about 100 and about 200 angstroms.

DETAILED DESCRIPTION OF THE INVENTION

In the present invention, a hydrocarbon oil is treated serially in two or more reaction zones containing catalysts. The oil is first treated in the presence of hydrogen with a first hydroprocessing catalyst having a narrow pore size distribution of relatively large pores and wherein at least a portion of the hydroprocessed hydrocarbon product is further treated in a second hydroprocessing reaction zone with a second hydroprocessing catalyst having a narrow pore size distribution of relatively smaller pores than the first hydroprocessing catalyst. The process of the invention is particularly well suited for both hydrodesulfurization and hydrodemetallation of a hydrocarbon oil containing a high content of metallic contaminants and sulfur.

The invention is directed to a process for the utilization of hydroprocessing catalysts, and more preferably, of hydroprocessing catalysts comprising active metals on a support, and more preferably still, of hydrodesulfurization catalysts comprising Group VIII and VIB active metal components on a non-zeolitic support consisting essentially of porous refractory oxide material. Porous refractory oxides useful in these and other hydroprocessing catalysts include silica, magnesia, silica-magnesia, zirconia, silicazirconia, titania, silica-titania, etc. Mixtures of the foregoing oxides are also contemplated, especially when prepared as homogeneously as possible.

The preferred refractory oxide material comprises aluminum and is usually selected from the group consisting of alumina and silica-alumina. For hydrodesulfurization, gamma alumina is a most highly preferred refractory oxide.

For catalytic purposes, the support material is usually prepared in the form of shaped particulates by methods well known in the art, with the preferred method being to extrude a precursor of the desired support, as for example, an inorganic refractory oxide gel such as a spray-dried or peptized alumina gel, through a die having openings therein of desired size and shape, after which the extruded matter is cut into extrudates of desired length, typically the average length being at least about twice that of the cross-sectional diameter. The cross-sectional diameter as disclosed herein is the longest dimension on the cross-section taken perpendicular to the longest axis of symmetry of the particle. Preferred refractory oxide particles are cylindrically or polylobally shaped and have a cross-sectional diameter of usually about 1/40 to about ⅛ inches, and preferably about 1/32 to about 1/16 inches. Among the preferred refractory oxide particles, at least for hydrodesulfurization, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.04 inches. The preferred particulates are those having cross-sectional shapes that are quadralobal, as in FIG. 10 of U.S. Pat. No. 4,028,227, and most preferably when the lobes arise from circles of equal diameter having their centers at the verticies of a rhombus having diagonals intersecting at the center of the cross-section.

Support particles prepared by the foregoing or equivalent procedures are generally precalcined, especially if gamma alumina is the desired support material. Temperatures above about 900° F. are usually required to convert alumina gel or hydrated alumina particulates to gamma alumina. Typically, temperatures between about 1100° F. and 1550° F. are utilized to effect this transformation, with holding periods of ¼ to 3 hours generally being effective.

To prepare the hydroprocessing catalysts, the support material is compounded, as by impregnation of the calcined support particles, with one or more precursors of a catalytically active metal or metals. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a relatively large volume of the impregnation solution, and yet one more method, the preferred method, is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example, at temperatures between 900° F. and 1,400° F., converts the metals to their respective oxide forms. This second calcination, however, may be avoided in alternative embodiments of the invention, as for example, by comulling the active metals with the support material rather than impregnating the metals thereon. In comulling, the precursor of the support material, usually in a hydrated or gel form, is admixed with precursors of the active metal components, either in solid form or in solution, to produce a paste suitable for shaping by known methods, e.g., pelleting, extrusion, etc. A subsequent calcination yields a hydroprocessing catalyst containing the active metals in their respective oxide forms.

When the first and second hydroprocessing catalysts are prepared by the foregoing or equivalent methods, the active components are usually selected from the Group VIB and VIII metals of the Periodic Table of Elements. Preferably, the catalysts contain both a Group VIB and VIII element, with nickel and cobalt being the preferred Group VIII metals and molybdenum and tungsten being the preferred Group VIB metals, and with cobalt and molybdenum in combination being the most preferred active metals for hydrodesulfurization catalysts. The usual hydroprocessing catalyst will contain from 0 to 20, usually from 1 to 20 percent by weight of the Group VIII metal, calculated as the monoxide, and from about 3 to about 30 percent by weight of the Group VIB metal, calculated as the trioxide.

In accordance with the invention, a first hydroprocessing catalyst is prepared so as to have a narrow pore size distribution wherein essentially all the pores are of diameter greater than about 100 angstroms, less than about 10 percent of the total pore volume is in pores of diameter greater than about 300 angstroms, and at least about 35 percent of the total pore volume is in pores of diameter from about 150 to about 200 angstroms. The catalyst has a total pore volume usually less than about 1.2 cc/gram, and an average pore diameter greater than about 180 angstroms. Preferably, the first hydroprocessing catalyst has at least 80 percent, and most preferably, at least 85 percent of its total pore volume in pores of diameter about 150 angstroms to about 300 angstroms and a surface area less than about 200 m$^2$/gram, and preferably about 75 m$^2$/gram to about 200 m$^2$/gram. Also preferably, the first hydroprocessing catalyst has an average pore diameter between about 180 angstroms and about 220 angstroms and a total pore volume about 0.4 cc/gram to about 0.8 cc/gram, with at least about 20 percent, usually about 30 percent, and most usually at least about 40 percent of the total pore volume being in pores of diameter about 200 angstroms to about 300 angstroms. It is most highly preferred that the first hydroprocessing catalyst have at least about 85 percent of the total pore volume in pores of diameter between about 150 angstroms and about 300 angstroms, with an average pore diameter of about 190 angstroms to about 210 angstroms and a surface area from about 90 m$^2$/gram to about 150 m$^2$/gram.

In a particularly preferred embodiment of the invention, the catalyst in the first hydroprocessing reaction zone has an average pore diameter of about 190 angstroms to about 210 angstroms with at least about 85 percent of the total pore volume being in pores of diameter about 150 angstroms to about 300 angstroms, with at least about 35 percent of the total pore volume being in pores of diameter about 150 angstroms to about 200 angstroms, at least about 40 percent of the total pore volume being in pores of diameter from about 200 angstroms to about 300 angstroms, less than 10 percent of the total pore volume being in pores of diameter greater than about 300 angstroms and the surface area being from about 90 m$^2$/gram to about 150 m$^2$/gram. Moreover, the catalyst contains about 8 to about 16 weight percent of molybdenum components, calculated as MoO$_3$, and about 1 to about 8 weight percent of cobalt components, calculated as CoO, on a support consisting essentially of gamma alumina.

A second hydroprocessing catalyst utilized in a second reaction zone to treat at least a portion of the product hydrocarbon from the first reaction zone has a smaller average pore diameter than that of the first hydroprocessing catalyst, usually by at least about 30 angstroms, preferably by at least about 35 angstroms, and most preferably by about 35 to about 65 angstroms. The catalyst usually has a total pore volume less than about 0.65 cc/gram, and preferably about 0.25 cc/gram to about 0.65 cc/gram. Generally, the total pore volume of the catalyst consists essentially of pores of diameter greater than 100 angstroms, less than about 10 percent, preferably less than 6 percent, of the total pore volume being in pores of diameter greater than about 300 angstroms, and at least about 35 percent of the total pore volume being in pores of diameter about 150 to about 200 angstroms. The catalyst has an average pore diameter less than about 180 angstroms, preferably about 140 angstroms to about 180 angstroms, and most preferably about 150 angstroms to about 170 angstroms. It is preferred that the second hydroprocessing catalyst have greater than about 80 percent of its total pore volume in pores of diameter from about 100 angstroms to about 200 angstroms and a surface area less than about 300 m$^2$/gram, preferably less than 200 m$^2$/gram, and most preferably in a range of about 100 m$^2$/gram to about 200 m$^2$/gram. The catalyst preferably has at least about 20 percent, more preferably about 30 percent, and most preferably at least 40 percent of the total pore volume in pores of diameter from about 100 to about 150 angstroms.

In a particularly preferred embodiment of the invention, the second hydroprocessing catalyst contains about 11 to about 14 weight percent of molybdenum components, calculated as MoO$_3$, about 2.5 to about 5.5 weight percent of cobalt components, calculated as CoO, on a refractory oxide support consisting essentially of a lithium and/or phosphorus-containing alumina. The catalyst is prepared so that essentially all its pores are of diameter greater than about 100 angstroms, with at least about 80 percent of the total pore volume being in pores of diameter from about 100 angstroms to about 200 angstroms with at least about 35 percent of the total pore volume being in pores of diameter from about 150 angstroms to about 200 angstroms, less than about 6 percent of the total pore volume being in pores of diameter greater than 300 angstroms, and having an average pore diameter of about 150 angstroms to about 170 angstroms and a surface area of about 100 m$^2$/gram to about 200 m$^2$/gram.

An unusual porosity feature of the catalysts used in the invention is that both the first and second hydroprocessing catalysts are similar in three critical characteristics. First, both catalysts are prepared so that essentially all the pores thereof are of diameter greater than about 100 angstroms. These relatively large pores in both catalysts provide essentially free access to the active catalytic sites for essentially all the large aromatic polycyclic molecules, especially asphaltenes, in which a substantial proportion of the metallic contaminants in hydrocarbon oil residua is usually contained. Second, less than 10 percent of the total pore volumes of the catalysts is in pores of diameter greater than 300 angstroms, including preferably less than about 6 percent in pores of diameter greater than 500 angstroms. Elimination of any significant number of macropores in the catalysts (i.e. catalysts having less than 10 percent of the total pore volume in pores of diameter greater than 300 angstroms) is a contributing factor in maximizing the surface area for the active catalytic sites. Third, both catalysts have at least about 35 percent, and preferably at least about 40 percent of the total pore volumes in pores of diameter from about 150 angstroms to about 200 angstroms.

Catalysts prepared in accordance with the invention are employed under hydroprocessing conditions suited for their intended purposes, as for example, hydrocracking, hydrotreating or hydrodesulfurization with usual conditions being an elevated temperature above 600° F. and a pressure above 500 p.s.i.g. and the presence of hydrogen. Such catalysts are also activated in accordance with methods suited to such catalysts. As an illustration, most hydroprocessing catalysts are more active, sometimes even far more active, in a sulfided or reduced form than in the oxide form in which they are generally prepared. Accordingly, hydroprocessing catalysts prepared in accordance with the invention may be sulfided or reduced prior to use (in which case the procedure is termed "presulfiding" or "prereducing") by passing a sulfiding or reducing gas, respectively, over the catalyst prepared in the calcined form. Temperatures between 300° and 700° F. and space velocities between about 150 and 500 v/v/hr are generally employed, and this treatment is usually continued for about two hours. Hydrogen may be used to prereduce the catalyst while a mixture of hydrogen and one or more components selected from the group consisting of sulfur vapor and the sulfur compounds (e.g., lower molecular weight thiols, organic sulfides, and especially H$_2$S) is suitable for presulfiding. Generally speaking, the relative proportion of hydrogen in the presulfiding mixture is not critical, with any proportion of hydrogen ranging between 1 and 99 percent by volume being adequate.

If the catalyst is to be used in a sulfided form, it is preferred that a presulfiding procedure be employed. However, since many hydroprocessing catalysts are used to upgrade sulfur-containing hydrocarbons, as in hydrodesulfurization, one may, as an alternative, accomplish the sulfiding in situ, particularly with hydrocarbon oils containing 1.0 weight percent or more of sulfur under conditions of elevated temperature and pressure.

Preferably the first and second hydroprocessing catalysts are employed in a process for the hydrodesulfurization of hydrocarbon oils and are usually employed as either a fixed or fluidized bed of particulates in a suitable reactor vessel wherein the oils to be treated are introduced and subjected to elevated conditions of pressure and temperature, and a substantial hydrogen partial pressure, so as to effect the desired degree of desulfurization, denitrogenation, and demetallization. Most usually, the first and second catalysts are maintained as a fixed bed, preferably in a volume ratio from about 10 to 1 to about 1 to 10, first to second catalyst, with the oil passing downwardly therethrough. It is highly preferred that the process be performed in a train of several reactors required for severe hydrodesulfurization, as for example, in a five train reactor having the first and second reactors loaded with the first hydroprocessing catalyst and the remaining reactors with the second hydroprocessing catalyst. The reactors are generally operated under the same or an independent set of conditions selected from those shown in the following Table I:

TABLE I

| Operating Conditions | Suitable Range | Preferred Range |
|---|---|---|
| Temperature, °F. | 500–900 | 600–850 |
| Hydrogen Pressure, p.s.i.g. | 500–3000 | 1000–2500 |
| Space Velocity, LHSV | 0.05–3.0 | 0.1–1.5 |
| Hydrogen Recycle Rate, scf/bbl | 1000–15000 | 2000–10000 |

Contemplated for treatment by the process of the invention are hydrocarbon-containing oils, herein referred to generally as "oils," including broadly all liquid and liquid/vapor hydrocarbon mixtures such as crude petroleum oils and synthetic crudes. Among the typical oils contemplated are top crudes, vacuum and atmospheric residual fractions, heavy vacuum distillate oils, shale oils, oils from bituminous sands, coal compositions, and the like, which contain sulfur and one or more of such contaminant metals as vanadium, nickel, iron, sodium, zinc, and copper. Typically, any sulfur and metals-containing hydrocarbon oils, preferably containing at least about one weight percent of sulfur and in excess of 2 ppmw of total contaminant metals, may be treated in accordance with the invention. Since the metallic poisons which deactivate hydrocarbon refining catalysts are generally associated with the asphaltene components of the oil, the process will be more commonly applied to the higher boiling fractions in which the asphaltene components concentrate. The process of the invention is especially useful for treating oils containing more than about 50 ppmw, and preferably, more than 100 ppmw of nickel plus vanadium contaminant metals, and between about 1 and 8 weight percent or more of sulfur, as for example, atmospheric and vacuum distillation residua which contain a substantial proportion of asphaltenes. The typical residuum for treatment herein is high boiling (i.e., at least 95% of its constituents boil above about 600° F. and often contains undesirable proportions of nitrogen, usually in a concentration between about 0.2 and 0.4% by weight. Such sulfur, nitrogen and metals-contaminated oils commonly have an API gravity less than about 30°, and usually less than about 25°.

In one embodiment of the invention, a hydrocarbon oil is successively passed through two reaction zones, each containing a different hydroprocessing catalyst at a temperature of about 500° F. to about 900° F. and at a LHSV of about 0.05 to about 3.0 and in the presence of hydrogen at a partial pressure about 500 to about 3,000 p.s.i.g., employed at a recycle rate of about 1,000 to about 15,000 scf/bbl. The first hydroprocessing catalyst has an average pore diameter at least about 30 angstroms larger than the other, and both catalysts contain one or more hydrogenation metal components on a porous refractory oxide support material with essentially all the pores having diameters greater than about 100 angstroms, and with less than 10 percent of the total pore volume being in pores of diameter greater than 300 angstroms, and with at least about 35 percent of the total pore volume being in pores of diameter about 150 to about 200 angstroms.

In a preferred embodiment of the invention, a hydrocarbon oil containing at least about 50 ppmw of total contaminant metals is contacted at a temperature about 600° F. to about 850° F. and at a LHSV about 0.1 to about 1.5 with a first hydrodemetallization catalyst having at least about 80 percent of the total pore volume in pores of diameter about 150 angstroms to about 300 angstroms and a surface area about 75 m$^2$/gram to about 200 m$^2$/gram. The resultant product is subsequently contacted with a dual-function hydrodemetallization/hydrodesulfurization catalyst having at least about 80 percent of the total pore volume in pores of diameter from about 100 angstroms to about 200 angstroms and a surface area from about 100 m$^2$/gram to about 200 m$^2$/gram. Both catalysts contact the hydrocarbon oil in the presence of hydrogen at a partial pressure about 1,000 to about 2,500 p.s.i.g. and recycled at about 2,000 to about 10,000 scf/bbl. The demetallization catalyst has an average pore diameter at least about 35 angstroms larger than the dual-function catalyst, and both catalysts contain one or more Group VIII metal components and/or one or more Group VIB metal components on an alumina-containing porous refractory oxide material so that essentially all its pores are of diameter greater than 100 angstroms, with less than 10 percent of the total pore volume being in pores of diameter greater than 300 angstroms, and with at least about 35 percent of the total pore volume being in pores of diameter from about 150 angstroms to about 200 angstroms. The product hydrocarbon obtained from this two-stage process contains at least about 85 percent less contaminant metals and sulfur than the hydrocarbon oil.

Although contaminant metals are continuously deposited on the surface and in the pores of all catalysts utilized in the invention during the course of hydroprocessing, the first hydroprocessing catalyst need not be removed from service until accumulating contaminant metals to the extent of at least about 25 weight percent, preferably at least about 40 weight percent, and most preferably at least about 50 weight percent of the catalyst. Additionally, the second hydroprocessing catalyst may accumulate contaminant metals to the extent of at least about 5, preferably greater than 15, and most preferably greater than 25 weight percent of the catalyst, and, in its preferred use as a dual-function hydrodemetallization/hydrodesulfurization catalyst, still maintain at least about 85 percent desulfurization of the hydrocarbon oil.

An unusual feature of the invention is the more efficient utilization of the pore volume of the catalyst particles as evidenced by similar concentrations of contaminant metals accumulated on the exterior surface of a particle and accumulated at a substantial depth within the particle. Such similar concentrations of contaminant metals may be determined analytically using a scanning electron microscope (SEM) to produce line scans traversing a cross-sectional plane of a catalyst particle between a point on its exterior surface and a point at a substantial depth within. For preferred catalyst particles having at least one symmetrical cross-section, a substantial depth is determined by reference to the perpendicular bisection of the longest axis of symmetry. On this cross-section, those points which are everywhere equidistant from the perimeter while defining a similar shape as the cross-section but encompassing only 25 percent of its area are points which are considered herein to lie at a substantial depth within the particle. Line scan examinations of such cross-sections after the particles have been removed during a hydroprocessing run, as well as at or near the end of the run, reveal that the concentration of contaminant metals at the described depth will typically average at least 75 percent, preferably between 85 and 125 percent, and most preferably between 90 and 110 percent of the concentration of the contaminant metals on the surface of the particle. The same relative percentages of metals concentration between the exterior and an internal depth location apply to corresponding points on surfaces of imaginary internal and actual exterior volumes of similar shape for catalyst particles having no symmetrical cross-section. However, the depth within the particle is determined from the imaginary internal volume, having a surface of points everywhere equidistant from corresponding points on the actual exterior of the particle, but encompassing only 50 percent of the actual exterior volume of the particle. It is believed that activity and/or stability improvement of the catalysts promoting the process of the invention is attributable in part to a more efficient utilization of the pore volumes during the penetration and accumulation of contaminant metals into the catalysts.

The pore diameters of the catalysts utilized in the process of the invention contribute to the improved penetration and accumulation of contaminant metals during hydroprocessing as compared to those utilized in conventional hydroprocessing. At the end of a hydroprocessing run, line scan examinations of catalysts utilized in the invention and removed from service reveal that a concentration of contaminant metals at a substantial depth within the particles will ordinarily be greater than 75 percent, preferably 85 to 115 percent, and most preferably 90 to 110 percent of the concentration of contaminant metals on the exterior when essentially all of the total pore volume in the catalyst is in pores of diameter of at least about 100 angstroms. Such results have been found to particularly pertain to the hydroprocessing catalyst utilized in the first reactor in the process of the invention when its average pore diameter lies in the preferred range of about 190 to about 210 angstroms.

The invention is further illustrated by the following example which is illustrative of a specific mode of practicing the invention and is not intended as limiting the scope of the appended claims.

EXAMPLE

A combination of catalysts A and B, prepared in accordance with the invention, is tested to determine its demetallization and desulfurization activity against a combination of two reference catalysts, C and D, consisting of particles of commercially available demetallization and desulfurization catalysts.

Catalyst A is prepared as follows: 96 grams of alumina support particles are impregnated with 85 ml of an aqueous solution containing 17 grams of ammonium heptamolybdate [$(NH_4)_6Mo_7O_{24} \cdot 4H_2O$] and 17.5 grams of cobalt nitrate [$Co(NO_3)_2 \cdot 6H_2O$]. After aging for 2 hours, the catalyst is dried at 110° C. and calcined at 1,200° F. in flowing air. A final catalyst is produced having a nominal composition as follows: 12.0 weight percent of molybdenum components, calculated as $MoO_3$, 4.0 weight percent of cobalt components, calculated as CoO, with the balance consisting essentially of gamma alumina.

Catalyst B is prepared as follows: 475 grams of alumina support particles are impregnated with 437 ml of an aqueous solution containing 22.4 grams of lithium nitrate ($LiNO_3$). The mixture is immediately dried at 110° C. and calcined at 1,500° F. in flowing air. The calcined lithium-containing support particulates are pre-wet with 57 ml of water and then impregnated with 380 ml of an aqueous solution containing 85.5 grams of ammonium heptamolybdate [$(NH_4)_6Mo_7O_{24} \cdot 6H_2O$], 68.4 grams of cobalt nitrate [$Co(NO_3)_2 \cdot 6H_2O$] and 36.9 ml of 85 percent phosphoric acid ($H_3PO_4$) solution. After aging for 2 hours, the catalyst is dried at 110° C. and calcined at 1,200° F. in flowing air. A final catalyst is produced having a nominal composition as follows: 12.0 weight percent of molybdenum components, calculated as $MoO_3$, 3.0 weight percent of cobalt components, calculated as CoO, 2.9 weight percent of phosphorus components, calculated as P, 1.0 weight percent lithium components, calculated as $Li_2O$, with the balance consisting essentially of gamma alumina.

The commercial catalysts C and D are both produced having a nominal composition as follows: 12.0 weight percent of molybdenum components, calculated as $MoO_3$, 4.0 weight percent of cobalt components, calculated as CoO, with the balance consisting essentially of silica-containing gamma alumina, the $SiO_2$ content being about 1.0 weight percent of the entire catalyst and about 1.2 weight percent of the support.

The final catalysts A, B, C and D, have the physical characteristics summarized in Table II.

TABLE II

PORE SIZE DISTRIBUTIONS AND SURFACE AREAS

| Pore Diameter, Angstroms | Catalyst A Pore Volume, cc/gram | Catalyst A % of total p.v. | Catalyst B Pore Volume, cc/gram | Catalyst B % of total p.v. | Catalyst C Pore Volume, cc/gram | Catalyst C % of total p.v. | Catalyst D Pore Volume, cc/gram | Catalyst D % of total p.v. |
|---|---|---|---|---|---|---|---|---|
| 40–100 | 0 | 0 | 0 | 0 | 0.41 | 66 | 0.49 | 94 |
| 100–150 | 0.03 | 4 | 0.27 | 43 | 0.035 | 6 | 0.01 | 2 |
| 150–200 | 0.30 | 42 | 0.26 | 41 | 0.01 | 2 | 0.005 | 1 |
| 200–300 | 0.325 | 45 | 0.075 | 12 | 0.01 | 2 | 0.0025 | 0.5 |
| 300–500 | 0.03 | 4 | 0.01 | 2 | 0.015 | 2 | 0.0025 | 0.5 |
| >500 | 0.035 | 5 | 0.015 | 2 | 0.14 | 22 | 0.01 | 2 |
| TOTAL PORE VOLUME | .72 | | .63 | | .62 | | .52 | |
| SURFACE AREA m²/gram | 120 | | 150 | | 300 | | 270 | |

Catalysts A and B and the reference catalysts are each presulfided for about 16 to about 20 hours by contact with a gas consisting of 90 volume percent $H_2$ and 10 volume percent $H_2S$ flowing at 4.4 SCFH at one atmosphere pressure. The temperature during the presulfiding is initially at room temperature, is increased gradually until 700° F. is reached, and then lowered to 550° F., at which time the catalyst is contacted with the feedstock.

The combination of catalysts A and B and the combination of reference catalysts C and D are then tested to determine their hydrodemetallization and hydrodesulfurization activities and temperature increase requirements (TIR), i.e., stability (or resistance to deactivation). The presulfided combination of catalysts A and B and the combination of reference catalysts C and D are each charged in separate runs to a reactor and utilized at 740° F. to hydrodesulfurize an Iranian atmospheric residua feedstock having the characteristics shown in Table III below under the following conditions: 2,000 p.s.i.g. total pressure, 1.0 LHSV, and a hydrogen rate of 6,000 SCF/B.

TABLE III

FEEDSTOCK PROPERTIES

| Feed Description | Iranian Atmospheric Residua |
|---|---|
| Gravity, °API | 16.6 |
| Sulfur, wt. % | 2.61 |
| Nitrogen, wt. % | 0.347 |
| Vanadium, ppm | 113 |
| Nickel, ppm | 37 |
| Ash, ppm | 230 |
| Carbon Residue, D-189, wt. % | 6.9 |
| Asphaltenes, (UTM-86), wt. % | 6.1 |
| Pour Point, °F. | +65 |
| ASTM D-1160 Distillation, °F. | |
| IBP | 505 |
| 5 | 627 |
| 10 | 682 |
| 20 | 753 |
| 30 | 820 |
| 40 | 872 |
| 50 | 942 |
| 60 | 1033 |
| Max | 1035 |
| Rec | 61.0 |

Top portions of the two separate reactors contain Catalysts A and C, while corresponding bottom portions contain Catalysts B and D, respectively. The volume ratio of Catalyst A to Catalyst B and Catalyst C to Catalyst D is 3 to 7. A portion of the feedstock is passed downwardly through each reactor and contacted with the described combinations of catalysts in a single-stage, single-pass system with once-through hydrogen such that the effluent sulfur and metals concentrations are maintained at 0.3 weight percent and 15 ppm, respectively, equivalent to about 90 percent desulfurization and about 90 percent demetallization. The calculated temperatures required for these conversions, as adjusted from actual operating reactor temperatures, are summarized in Table IV.

TABLE IV

| Catalysts | Catalysts Age, days | | | | | |
|---|---|---|---|---|---|---|
| | 1 | 15 | 25 | 30 | 35 | 43 |
| DEMETALLIZATION TEMPERATURES REQUIRED, °F. | | | | | | |
| A and B | 750 | 780 | 793 | 810 | 810 | 830 |
| C and D | 806 | 830 | 846 | 874 | 893 | 950 |
| DESULFURIZATION TEMPERATURES REQUIRED, °F. | | | | | | |
| A and B | 745 | 790 | 803 | 813 | 808 | 825 |
| C and D | 745 | 770 | 788 | 807 | 828 | 915 |

In view of the data in Table IV relative to demetallization of the feedstock, the combination of catalysts A and B is noticeably more active than the combination of catalysts C and D during the entire run. After 1, 15, 25 and 30 days, the A-B combination is between about 50° F. and 60° F. more active than the C-D combination, and improves to about 83° F. and 120° F. more active as the run extends to 35 and 43 days, respectively.

Temperature increase requirements (TIR) for demetallization purposes after 25 days is approximately 1.7° F./day and 1.6° F./day for combination A-B and combination C-D, respectively. However, the TIR from day 25 through day 43 dramatically increases to approximately 4.1° F./day for combination C-D, while combination A-B of the invention improves to 1.5° F./day.

For desulfurization purposes, combination A-B although initially slightly less active after 15, 25 and 30 days (~20° F. down to 6° F.), improves to about 20° F. and 90° F. more active than combination C-D as the run extends to 35 and 43 days, respectively.

Temperature increase requirements (TIR) for desulfurization purposes after 25 days is approximately 2.3° F./day and 1.7° F./day for combination A-B and combination C-D, respectively. In a similar manner to that for demetallization, the TIR from day 25 through day 43 increases substantially to approximately 5.1° F./day for combination C-D, while combination A-B improves significantly to 1.4° F./day.

The relative activities of combination A-B compared to combination C-D after 35 days are calculated from standard equations assuming second order kinetics. The relative demetallization activity for combination A-B is 406 in contrast to 100 for combination C-D. Further-more, the relative desulfurization activity is 164 for combination A-B of the invention as compared to combination C-D.

While particular embodiments of the invention have been described, it will be understood, of course, that the invention is not limited thereto since many obvious modifications can be made, and it is intended to include within this invention any such modifications as will fall within the scope of the appended claims

We claim:

1. A process for the catalytic hydroprocessing of a hydrocarbon oil comprising successively contacting said oil in the presence of hydrogen under hydroprocessing conditions with a first hydroprocessing catalyst in a first reaction zone and, subsequently, a second hydroprocessing catalyst in a second reaction zone, said first catalyst and said second catalyst comprising one or more hydrogenation metal components on a porous refractory oxide support material with essentially all the pores having diameters greater than about 100 angstroms, and with less than 10 percent of the total pore volume being in pores of diameter greater than 300 angstroms, and with at least about 35 percent of the total pore volume being in pores of diameter about 150 to about 200 angstroms, said first hydroprocessing catalyst having an average pore diameter at least about 30 angstroms larger than the average pore diameter of said second hydroprocessing catalyst.

2. The process as defined in claim 1 wherein the volume ratio of said first hydroprocessing catalyst to said second hydroprocessing catalyst is between about 1:10 and 10:1.

3. The process as defined in claim 1 wherein said catalysts have a total pore volume less than about 1.2 cc/gram.

4. The process as defined in claim 1 wherein said first hydroprocessing catalyst has an average pore diameter greater than about 180 angstroms.

5. The process as defined in claim 1 wherein said second hydroprocessing catalyst has an average pore diameter less than about 180 angstroms.

6. The process as defined in claim 1 wherein said first hydroprocessing catalyst has at least 80 percent of the total pore volume in pores of diameter from about 150 angstroms to about 300 angstroms and a surface area less than about 200 m²/gram.

7. The process as defined in claim 1 wherein said second hydroprocessing catalyst has at least about 80 percent of the total pore volume in pores of diameter from about 100 angstroms to about 200 angstroms and a surface area less than about 300 m²/gram.

8. The process as defined in claim 1 wherein said refractory oxide support material consists essentially of gamma alumina.

9. The process as defined in claim 1 wherein said hydrogenation metal components are selected from the group consisting of Group VIB and Group VIII metals.

10. The process as defined in claim 1 wherein said second hydroprocessing catalyst has a total pore volume less than about 0.65 cc/gram.

11. The process as defined in claim 4 wherein said first hydroprocessing catalyst has an average pore diameter about 180 angstroms to about 220 angstroms.

12. The process as defined in claim 5 wherein said second hydroprocessing catalyst has an average pore diameter about 140 angstroms to about 180 angstroms.

13. The process as defined in claim 1 wherein said catalytic hydroprocessing includes demetallization and desulfurization.

14. The process as defined in claim 1 wherein said first and second hydroprocessing catalysts both have at least about 40 percent of their pore volumes in pores with diameters about 150 angstroms to about 200 angstroms.

15. A process for the hydrodesulfurization of a hydrocarbon oil containing a substantial proportion of contaminant metals, said process comprising the steps of:

(1) contacting said oil in the presence of hydrogen under reaction conditions with a hydrodemetallization catalyst comprising an alumina support and one or more hydrogenation components selected from the group consisting of Group VIB metal components and Group VIII metal components, said catalyst with essentially all the pores having diameters greater than about 100 angstroms, at least about 80 percent of the total pore volume being in pores of diameter about 150 angstroms to about 300 angstroms, with at least about 35 percent of the total pore volume being in pores of diameter from about 150 to about 200 angstroms, less than about 10 percent of the total pore volume being in pores of diameter greater than 300 angstroms, and a surface area about 75 m²/gram to about 200 m²/gram, so as to produce a first hydrocarbon product having a lower contaminant metals content than said oil; and (2) contacting at least a portion of the hydrocarbon product from said step (1) in the presence of hydrogen under reaction conditions with a hydrodesulfurization catalyst comprising an alumina support and one or more hydrogenation components selected from the group consisting of Group VIB metal components and Group VIII metal components, said hydrodesulfurization catalyst with essentially all the total pore volume in pores having diameters greater than about 100 angstroms, at least about 80 percent of the total pore volume being in pores of diameter about 100 angstroms to about 200 angstroms, with at least about 35 percent of the total pore volume being in pores of diameter about 150 to about 200 angstroms, less than about 10 percent of the total pore volume being in pores of diameter greater than 300 angstroms, and a surface area about 100 m²/gram to about 200 m²/gram, said hydrodesulfurization catalyst having an average pore diameter at least about 35 angstroms smaller than the average pore diameter of said hydrodemetallization catalyst, so as to produce a second product hydrocarbon having substantially less sulfur and contaminant metals content than said oil.

16. The process as defined in claim 1 or 15 wherein said hydrocarbon oil contains at least about 50 ppmw of total contaminant metals.

17. The process as defined in claim 1 or 15 wherein said hydrocarbon oil comprises a substantial proportion of asphaltenes.

18. The process as defined in claim 15 wherein said first hydrodesulfurization catalyst has a total pore volume about 0.4 cc/gram to about 0.8 cc/gram.

19. The process as defined in claim 15 wherein said second hydrodesulfurization catalyst has a total pore volume about 0.25 cc/gram to about 0.65 cc/gram.

20. The process as defined in claim 15 wherein said first hydrodesulfurization catalyst has an average pore diameter about 190 angstroms to about 210 angstroms.

21. The process as defined in claim 15 wherein said second hydrodesulfurization catalyst has an average pore diameter about 150 angstroms to about 170 angstroms.

22. A process for the catalytic hydrodesulfurization of a hydrocarbon residuum oil containing at least about 100 ppmw of contaminant metals and at least about one weight percent of sulfur, said process comprising the steps of:
(1) contacting said oil in the presence of hydrogen under hydrodemetallization conditions with a hydrodemetallizion catalyst comprising about 8 to about 16 weight percent of molybdenum components, calculated as $MoO_3$, about 1 to about 8 weight percent of cobalt components, calculated as CoO, on a support consisting essentially of gamma alumina, said hydrodemetallization catalyst with essentially all the pores having diameters greater than about 100 angstroms, at least about 85 percent of the total pore volume being in pores of diameter about 150 angstroms to about 300 angstroms, with at least about 35 percent of the total pore volume being in pores of diameter about 150 to about 200 angstroms, less than 10 percent of the total pore volume being in pores of diameter greater than 300 angstroms and a surface area about 90 $m^2$/gram to about 150 $m^2$/gram; and
(2) contacting at least a portion of the hydrocarbon product from said step (1) under reaction conditions with a second catalyst useful for both hydrodemetallization and hydrodesulfurization, said catalyst comprising about 8 to about 16 weight percent of molybdenum components, calculated as $MoO_3$, about 1 to about 8 weight percent of cobalt components, calculated as CoO, on a refractory oxide support comprising gamma alumina, said catalyst with essentially all the pores having diameters greater than about 100 angstroms, at least 80 percent of the total pore volume being in pores of diameter about 100 angstroms to about 200 angstroms, with at least about 35 percent of the total pore volume being in pores of diameter about 150 to about 200 angstroms, less than 6 percent of the total pore volume in pores of diameter greater than 300 angstroms and a surface area about 100 $m^2$/gram to about 200 $m^2$/gram, said catalyst having an average pore diameter at least about 35 angstroms smaller than the average pore diameter of said first hydrodemetallization catalyst, so as to remove at least 85 percent of said contaminant metals and at least 85 percent of said sulfur from said residuum oil.

23. The process as defined in claim 22 wherein said hydrodemetallization catalyst has an average pore diameter from about 190 angstroms to about 210 angstroms.

24. The process as defined in claim 22 wherein said catalyst in step (2) has an average pore diameter from about 150 angstroms to about 170 angstroms.

25. The process as defined in claim 15 or 22 wherein said catalyst in step (1) has at least about 40 percent of the total pore volume in pores of diameter about 200 angstroms to about 300 angstroms.

26. The process as defined in claim 15 or 22 wherein said catalyst in step (2) has at least about 40 percent of the total pore volume in pores of diameter about 100 angstroms to about 150 angstroms.

27. The process as defined in claim 1, 15 or 22 wherein said catalysts further comprise particulates having a cross-sectional diameter about 1/40 to about ⅛ inches.

28. The process as defined in claim 22 wherein said second catalyst contains about 11 to about 14 weight percent of said molybdenum components, about 2.5 to about 5.5 weight percent of said cobalt components on said refractory oxide support further comprising components selected from the group consisting of phosphorus and lithium.

29. A process for the catalytic hydroprocessing of a hydrocarbon oil, said process consisting essentially of successively contacting said oil in the presence of hydrogen under hydroprocessing conditions with a first hydroprocessing catalyst in a first reaction zone and, subsequently, a second hydroprocessing catalyst in a second reaction zone, said first catalyst and said second catalyst comprising one or more hydrogenation metal components on a porous refractory oxide support material with essentially all the pores having diameters greater than about 100 angstroms, and with less than 10 percent of the total pore volume being in pores of diameter greater than 300 angstroms, and with at least about 35 percent of the total pore volume being in pores of diameter about 150 to about 200 angstroms, said first hydroprocessing catalyst having an average pore diameter at least about 30 angstroms larger than the average pore diameter of said second hydroprocessing catalyst.

30. The process as defined in claim 29 wherein the volume ratio of said first hydroprocessing catalyst to said second hydroprocessing catalyst is between about 1:10 and 10:1.

31. The process as defined in claim 29 wherein said first hydroprocessing catalyst has an average pore diameter greater than about 180 angstroms.

32. The process as defined in claim 29 wherein said second hydroprocessing catalyst has an average pore diameter less than about 180 angstroms.

33. The process as defined in claim 29 wherein said first hydroprocessing catalyst has at least 80 percent of the total pore volume in pores of diameter from about 150 angstroms to about 300 angstroms and a surface area less than about 200 $m^2$/gram.

34. The process as defined in claim 29 wherein said second hydroprocessing catalyst has at least about 80 percent of the total pore volume in pores of diameter from about 100 angstroms to about 200 angstroms and a surface area less than about 300 $m^2$/gram.

35. The process as defined in claim 29 wherein said hydrogenation metal components are selected from the group consisting of Group VIB and Group VIII metals.

36. The process as defined in claim 29 wherein said catalytic hydroprocessing includes demetallization and desulfurization.

* * * * *